United States Patent [19]
Van Vleet et al.

[11] Patent Number: 5,368,336
[45] Date of Patent: Nov. 29, 1994

[54] SPLIT FITTING/SEAL

[75] Inventors: Frank R. Van Vleet, Andover; Michael P. Grimanis, Wayland, both of Mass.

[73] Assignee: A. W. Chesterton Company, Stoneham, Mass.

[21] Appl. No.: 95,864

[22] Filed: Jul. 22, 1993

[51] Int. Cl.$^5$ .............................................. F16L 35/00
[52] U.S. Cl. .................................. 285/24; 285/158; 285/177; 285/342; 285/373; 285/387; 285/910
[58] Field of Search ............... 285/387, 177, 373, 342, 285/133.1, 158, 910, 24

[56]  References Cited
U.S. PATENT DOCUMENTS

| | | | |
|---|---|---|---|
| 3,664,691 | 5/1972 | Nakamura | 285/373 X |
| 3,672,613 | 6/1972 | Oriani | 285/373 X |
| 4,258,944 | 3/1981 | Wendel | 285/387 X |
| 4,541,537 | 9/1985 | Sailor | 285/342 X |
| 4,778,204 | 10/1988 | Berger | 285/387 X |
| 4,924,569 | 5/1990 | Kennedy | 285/387 X |
| 5,022,684 | 6/1991 | Eagon | 285/387 X |

FOREIGN PATENT DOCUMENTS

| | | | |
|---|---|---|---|
| 1141273 | 8/1957 | France | 285/177 |
| 11002 | 10/1956 | Germany | 285/387 |

OTHER PUBLICATIONS

The Texas Company's brochure entitled "Operation and Care of Hydraulic Machinery", Copyright 1949, pp. 35–38.
1989 SAE Handbook, vol. 2, entitled "Parts & Components", pp. 19.73, 19.74, 19.78 and 19.81.

*Primary Examiner*—Dave W. Arola
*Attorney, Agent, or Firm*—Hill, Steadman & Simpson

[57] ABSTRACT

A split fitting for coupling two tubes, one having a large diameter, one having a small diameter, the fitting having mating first and second halves for surrounding the connection point between the larger and smaller tubes and forming a threaded neck portion for threading engagement with a nut slipped over an end of the larger tube for actuating a compression fitting to seal between the fitting and the larger tube. An O-ring seal is provided within the split fitting for sealing the fitting to the smaller diameter tube when assembled. The fitting halves are coupled together using captive screws and alignment pins.

16 Claims, 1 Drawing Sheet

SPLIT FITTING/SEAL

BACKGROUND OF THE INVENTION

The present application relates to tubing fittings and in particular to a split fitting which can be field installed without the need to install the fitting axially over the end of a tube or a pipe. Compression fittings for tubing connections are known. Typically, such connectors utilize a threaded nut slipped over the open end of a first tube and a ferrule slipped on the end of the first tube thereafter. The ferrule bites into the first tube either before or during the mating of the threaded nut with a male threaded tubing connector having a tapered inside bevel. The bevel uses a wedge action to compress the ferrule to seal between the nut and the first tube. The male threaded tubing connector is connected to a second tube.

SUMMARY OF THE INVENTION

The present invention provides a split fitting that can be installed onto a tube or pipe end without the need to thread the fitting over the open end of the tube or pipe. The fitting body is split in half axially with pins to align the two halves during assembly. Captive screws are used to secure the two halves together. This arrangement allows installation/replacement without complete disassembly of the piping system by using only the nut on the system. This is particularly advantageous in annular tubing arrangements where a smaller diameter tube fits within a larger one with any of the following conditions: the tube lengths are long, the fitting is bound within a tube/piping system, or a ferrule exists on the smaller tube and a new fitting cannot be put in place. In some instances, the same ferrule can be utilized. In other situations a split ferrule or a split O-ring can be used.

DETAILED DESCRIPTION OF THE PREFERRED EMBODIMENTS

Figure 1:
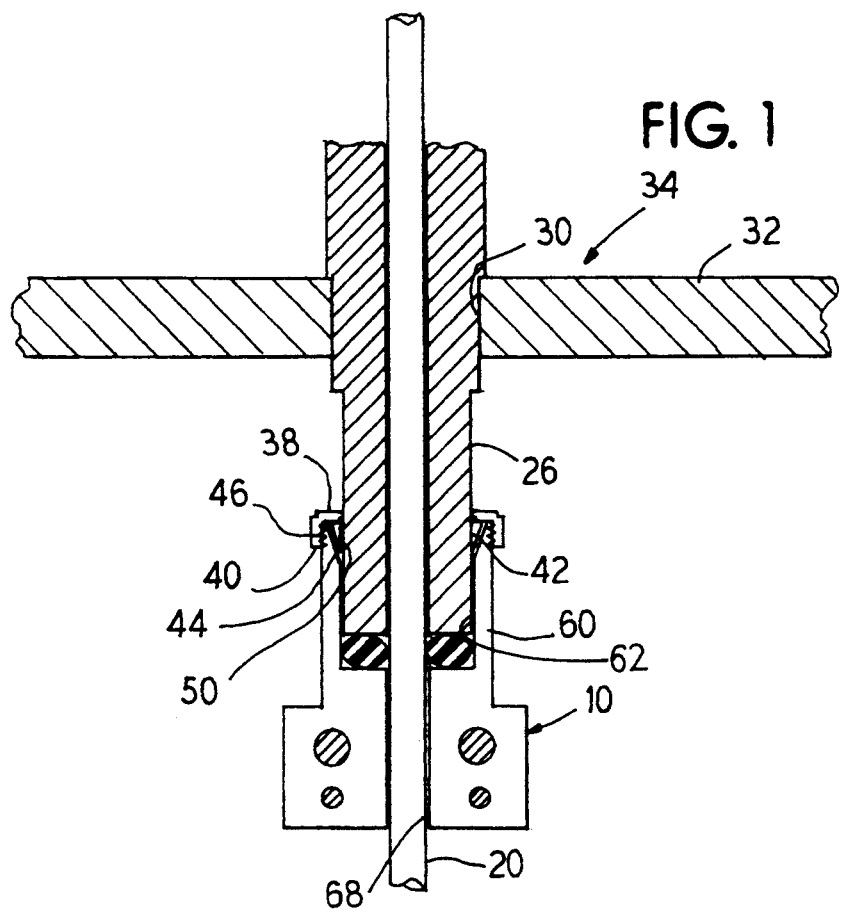
FIG. 1 is a longitudinal sectional view of the fitting installation of the present invention.

FIG. 1 illustrates a split fitting 10 installed to couple a small diameter tube 20 to a larger diameter tube 26, the larger diameter tube installed into an aperture 30 in a wall 32 of a pressurized system 34 such as to seal the in-core instrumentation at the seal table in a nuclear power plant. Typically, the smaller diameter tube 20 is a ⅜ inch tube and the larger diameter tube 26 is a ¾ inch tube. As shown in FIG. 1, installed on the larger diameter tube 26 is a nut 38 with its threaded open end 40 open toward the fitting 10.

Installed after the nut on the larger diameter tube 26 is a ferrule 42 which provides a beveled outside surface 44. The ferrule 42 may be a continuous ring or may be a split ferrule, depending on the application. The fitting 10 provides at its lead end external threads 46 for threading into the nut 38. An inside bevel 50 is provided on the lead end of the fitting which corresponds approximately to the bevel 44 of the ferrule. Thus, when the nut 38 is tightened down onto the threads 46, the beveled surfaces 44, 50 create a wedge action to clamp the ferrule 42 tightly around the larger diameter tube 26, and cause the ferrule 42 to bite into the larger diameter tube 26. Thus, a seal is effected between the inside bevel 50 and the larger diameter tube 26.

Forward of this seal, the larger diameter tube 26 is received within a neck portion 60 of the fitting 10 having a central bore 62 sized to closely surround an outer diameter of the larger diameter tube 26. The fitting provides an annular ledge 66 and a smaller diameter bore 68 open to the bore 62 and axially aligned therewith. Upon the ledge 66 is placed either a complete or split O-ring 70 which surrounds the smaller diameter tube 20 and abuts a leading end 74 of the larger diameter tube 26.

Figure 3:
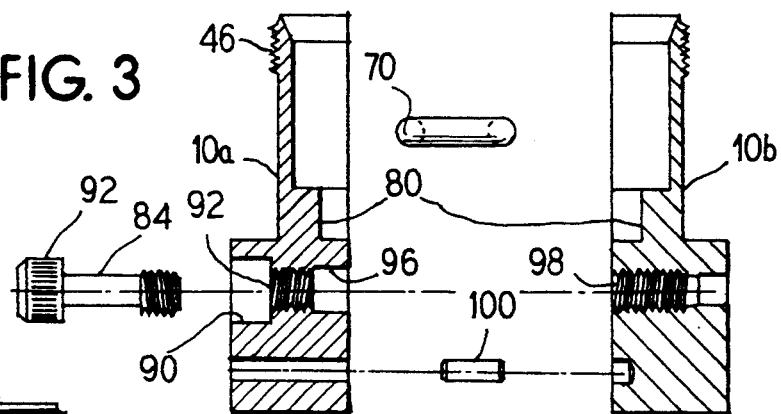
FIG. 3 is an exploded sectional view of the fitting shown in FIG. 2.

As shown in FIG. 3, when the split fitting 10 is assembled together, the O-ring 70 is squeezed by the annular wall 80 against the smaller diameter tube 20 to seal between the neck portion 60 and the smaller diameter tube 20. The O-ring 70 is captured between the leading end 74 of the larger diameter tube, the annular wall 80 and the smaller diameter tube 20 and the ledge 66.

Figure 2:
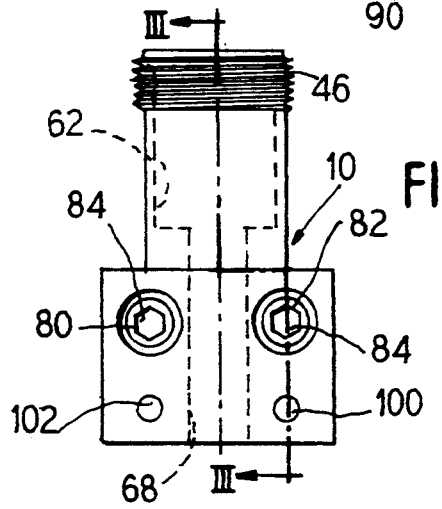
FIG. 2 is a front elevational view of the fitting element shown in FIG. 1.

FIGS. 2 and 3 illustrate the construction of the split fitting 10. Two captive screws 80, 82 are used to assemble the fitting. The screws have hexagonal sockets 84 for tightening with an allen wrench. As shown in FIG. 3, a first fitting half 10a is mated to a second fitting half 10b, the first fitting half has a countersunk bore 90 for the head 92 of the screws 80, 84 and a threaded region 92 which, in effect, captures the screw 84 onto the first fitting half 10a even when separated from the second fitting half 10b. Following the threaded region 92 is a straight bore region 96 which is aligned with a threaded region 98 of the second fitting half 10b. Once the first fitting half 10a is mated with the second fitting half 10b, the screws 80, 82 are threaded past the threaded region 92 and into the threaded region 98 to bind the two halves together. Two alignment pins 100, 102 are used to ease in assembly.

Although the present invention has been described with reference to a specific embodiment, those of skill in the art will recognize that changes may be made thereto without departing from the scope and spirit of the invention as set forth in the appended claims.

We claim as our invention:

1. A split fitting for coupling a first tube and a second tube, comprising:

a nut surrounding the first tube;

a first fitting body half and a second fitting body half matable together to surround said first tube and said second tube and when mated together providing a threaded neck portion for engagement with the nut surrounding the first tube, and forming an axial bore therethrough receiving the first and second tubes therein; and a compression fitting means arranged within the axial bore to effect a seal between the axial bore and the first tube when the neck portion is threaded onto said nut and drawn tight; and a split O-ring seal inserted within said axial bore and surrounding said second tube, said O-ring sized to seal said second tube to said axial bore upon mating of said first body with said second body.

2. The fitting according to claim 1, wherein said first body half comprises two bores and said second body half comprises two threaded holes in registry with said two bores; and two screws inserted through said two bores and threaded through said threaded holes; and at least one alignment bore in said first body half and at least one corresponding bore in said second body half and an alignment pin installed within both of said alignment bore and said corresponding bore.

3. The fitting according to claim 1, wherein said axial bore has a stepped profile for closely surrounding both said first tube and said second tube, said first tube having a larger diameter than said second tube.

4. The fitting according to claim 1, wherein said first and second body halves comprises a ledge within said axial bore and said split O-ring seal is trapped between said ledge and an end of said first tube.

5. The fitting according to claim 1, wherein said compression fitting means comprises a ferrule arranged tightly around said first tube and having a bevelled outside surface engageable to a lead end of said threaded neck portion, said ferrule arranged axially between said nut and said neck portion, said ferrule compressed therebetween and against said first tube when said nut is drawn tight on said threaded neck portion.

6. The fitting according to claim 5, wherein said threaded neck portion comprises an inside bevel angled to be flush with said bevelled outside surface.

7. The fitting according to claim 1, wherein said first tube has a greater outside diameter than said second tube and said axial bore has a first region with a first diameter closely conforming to the outside diameter of said first tube and a second region with a second diameter closely conforming to the outside diameter of said second tube, said first and second regions joining at a ledge and said O-ring seal positioned on said ledge fronting an end of said first tube.

8. The fitting according to claim 1, wherein said compression fitting means comprises a ferrule arranged tightly around said first tube and having a bevelled outside surface engageable to a lead end of said threaded neck portion, said ferrule arranged axially between said nut and said neck portion, said ferrule compressed therebetween and against said first tube when said nut is drawn tight on said threaded neck portion, said threaded neck portion comprises an inside bevel angled to be flush with said bevelled outside surface, said first tube has a greater outside diameter than said second tube and said axial bore has a first region with a first diameter closely conforming to the outside diameter of said first tube and a second region with a second diameter closely conforming to the outside diameter of said second tube, said first and second regions joining at a ledge and said O-ring seal positioned on said ledge fronting an end of said first tube.

9. A sealing arrangement for sealing a tube penetration into an aperture in a wall of a pressurized system, comprising:
   a first tube extending through the aperture and sealed thereto;
   a second tube having an outside diameter sized to pass axially through said first tube and through the wall;
   a nut surrounding the first tube;
   a first fitting body half and a second fitting body half matable together to surround said first tube and said second tube and when mated together providing a threaded neck portion for engagement with the nut surrounding the first tube, and forming an axial bore therethrough receiving the first and second tubes therein; and
   a compression fitting means arranged within the axial bore to effect a seal between the axial bore and the first tube when the neck portion is threaded onto said nut and drawn tight; and
   a split O-ring seal inserted within axial bore and surrounding said second tube, said O-ring sized to seal said second tube to said axial bore upon mating of said first body with said second body.

10. The fitting according to claim 9, wherein said first body half comprises two bores and said second body half comprises two threaded holes in registry with said two bores; and
    two screws inserted through said two bores and threaded through said threaded holes; and
    at least one alignment bore in said first body half and at least one corresponding bore in said second body half and an alignment pin installed within both of said alignment bore and said corresponding bore.

11. The fitting according to claim 9, wherein said axial bore has a stepped profile for closely surrounding both said first tube and said second tube, said first tube having a larger diameter than said second tube.

12. The fitting according to claim 9, wherein said first and second body halves comprises a ledge within said axial bore and said split O-ring seal is trapped between said ledge and an end of said first tube.

13. The fitting according to claim 9, wherein said compression fitting means comprises a ferrule arranged tightly around said first tube and having a bevelled outside surface engageable to a lead end of said threaded neck portion, said ferrule arranged axially between said nut and said neck portion, said ferrule compressed therebetween and against said first tube when said nut is drawn tight on said threaded neck portion.

14. The fitting according to claim 13, wherein said threaded neck portion comprises an inside bevel angled to be flush with said bevelled outside surface.

15. The fitting according to claim 9, wherein said first tube has a greater outside diameter than said second tube and said axial bore has a first region with a first diameter closely conforming to the outside diameter of said first tube and a second region with a second diameter closely conforming to the outside diameter of said second tube, said first and second regions joining at a ledge and said O-ring seal positioned on said ledge fronting an end of said first tube.

16. The fitting according to claim 9, wherein said compression fitting means comprises a ferrule arranged tightly around said first tube and having a bevelled outside surface engageable to a lead end of said threaded neck portion, said ferrule arranged axially between said nut and said neck portion, said ferrule compressed therebetween and against said first tube when said nut is drawn tight on said threaded neck portion, said threaded neck portion comprises an inside bevel angled to be flush with said bevelled outside surface, said first tube has a greater outside diameter than said second tube and said axial bore has a first region with a first diameter closely conforming to the outside diameter of said first tube and a second region with a second diameter closely conforming to the outside diameter of said second tube, said first and second regions joining at a ledge and said O-ring seal positioned on said ledge fronting an end of said first tube.

* * * * *